Sept. 29, 1970
W. H. DIEHL ET AL
3,531,260
FLUID-COOLED CHUCK WITH A FREEZE-THROUGH SENSOR
Filed July 28, 1967
3 Sheets-Sheet 1
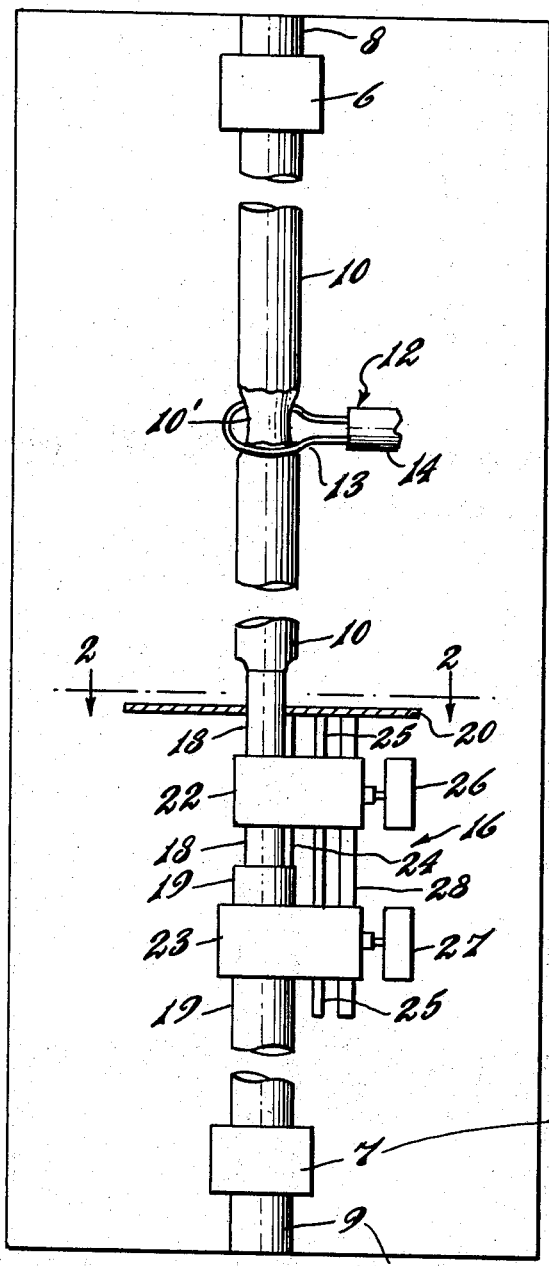
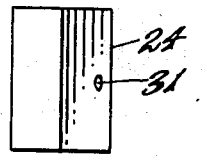
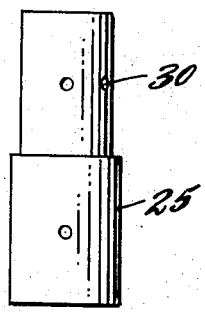
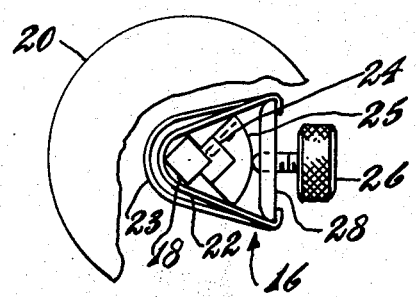
INVENTORS
W. H. Diehl
A. K. Lagarde, Jr.
BY
J. L. Landis
ATTORNEY

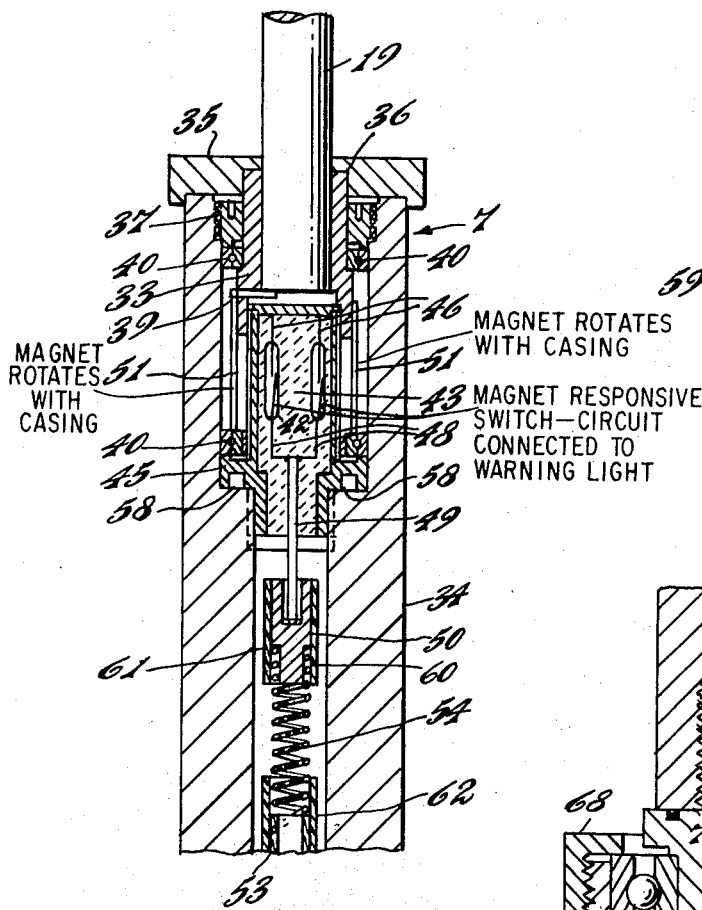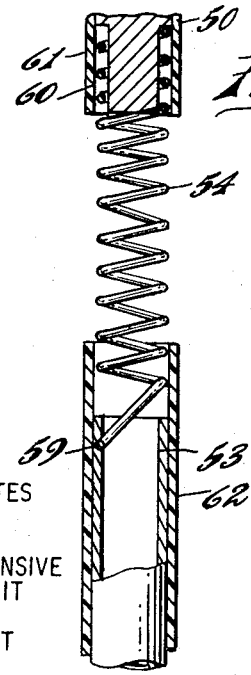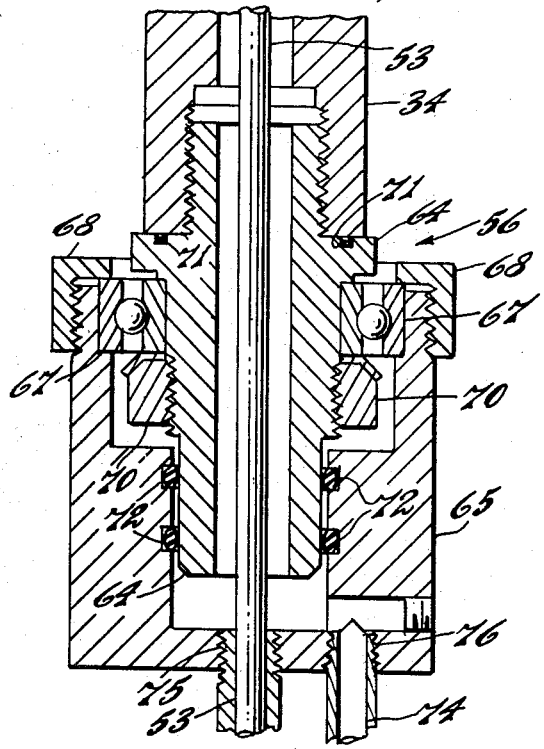

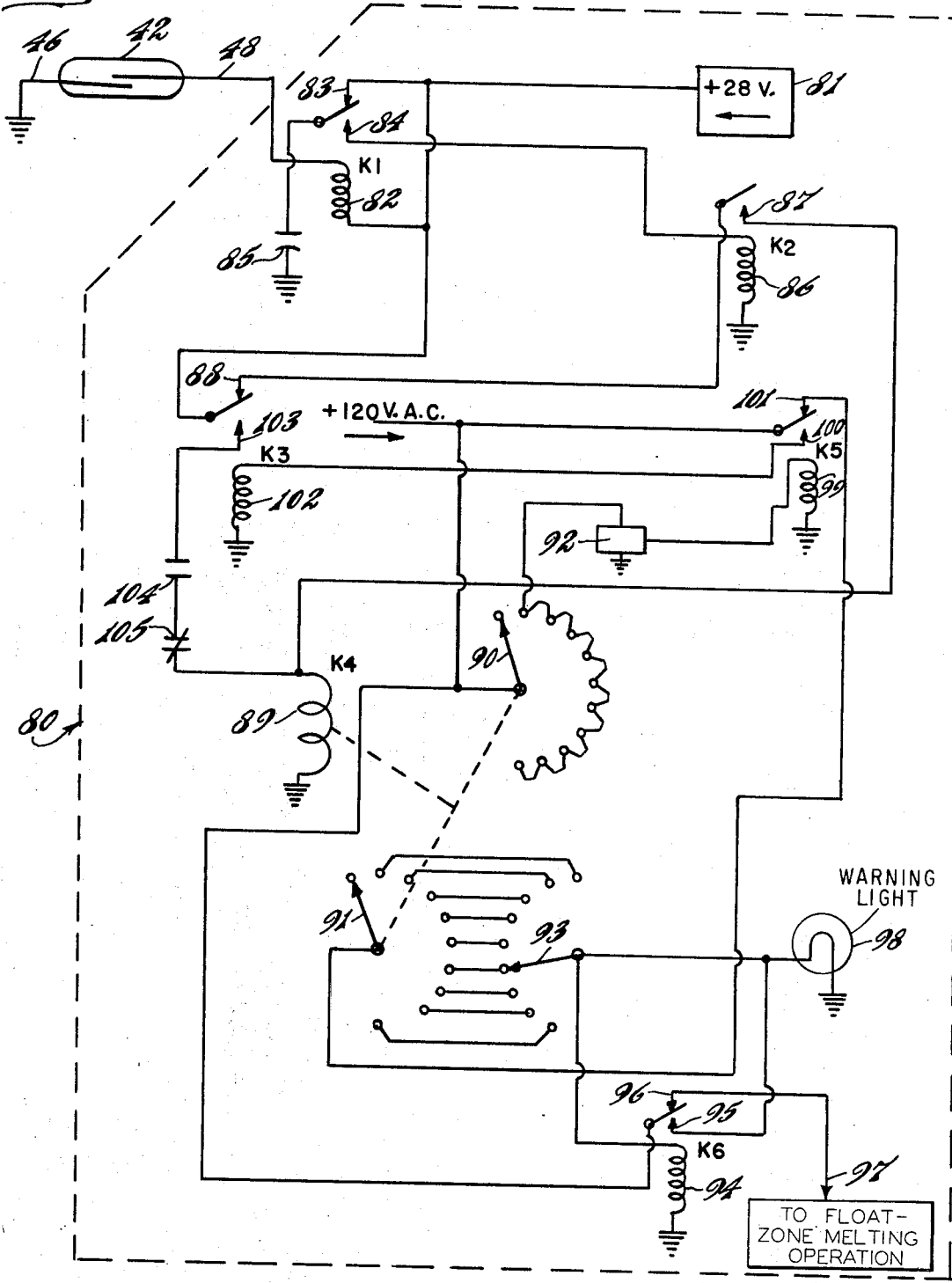

United States Patent Office 3,531,260
Patented Sept. 29, 1970

3,531,260
FLUID-COOLED CHUCK WITH A FREEZE-THROUGH SENSOR
Walter H. Diehl and Adolph K. Lagarde, Jr., Allentown, Pa., assignors to Western Electric Company, Incorporated, New York, N.Y., a corporation of New York
Filed July 28, 1967, Ser. No. 656,910
Int. Cl. B01j *17/10;* G08b *21/00;* H01h *36/00*
U.S. Cl. 23—273        7 Claims

ABSTRACT OF THE DISCLOSURE

A system of employing a fluid-cooled chuck assembly for suspending a fusible material during a float zone melting operation and sensing a freeze-through from relative motion of a rod attached to the chuck assembly.

BACKGROUND OF THE INVENTION

The present invention relates to apparatus for sensing a freeze-through during float zone melting operations and, more particularly, to a fluid-cooled chuck assembly system for rotating fusible material and sensing a freeze-through during a float zone melting operation.

The basic technique of crucible-free or float zone melting of fusible materials is disclosed in H. C. Theuerer Pat. No. 3,060,123, which patent, including the definitions therein, is hereby incorporated by reference. It is known that this technique provides a means of redistributing impurities in a fusible solid and can be used to purify semiconductor material or produce monocrystalline semiconductor rods for use in transistors and other semiconductor translating devices.

Normally, float zone melting is accomplished by passing a molten zone produced by inductive heating through a fusible solid, such as a semiconductor rod of silicon, which is vertically mounted between two chucks or rod holders. Inductive heating causes some stirring of the material in the molten zone thereby facilitating uniform distribution of impurities therein and the eventual transportation of impurities to one end of the fusible solid. However, significant stirring occurs as a result of thermal convection currents. Additional stirring of the molten zone can be accomplished by separately rotating the solid portions of the fusible material which is being processed. More importantly, this rotation provides desired thermal and mechanical symmetry in the fusible material. Rotation of the solid portions can be in the same direction or in opposite directions of revolution and at any desired speed between 0 and 100 or more revolutions per minute.

The effect of passing a molten zone along the length of a fusible solid is discussed extensively in W. G. Pfann Pat. No. 2,739,088, which patent is hereby incorporated by reference. The molten zone can be passed along substantially the entire length of the fusible material being treated by either moving the heating source or moving the material being treated. In either instance, it is necessary to sustain the molten mass between two solid portions of the fusible material being processed. This is accomplished by progressively melting one interface and progressively freezing the other interface of the molten zone while maintaining molten material in a position between the two solid portions undergoing processing.

It will be observed that many factors, including rate of advancement, heat, equipment vibration, etc., can cause the molten zone to freeze sufficiently to unite the ends of the two solid portions of the fusible material being treated. This condition is known as a "freeze-through." Operation down-time, damage to various supporting facilities and damage to the fusible material being treated are a few of the possible consequences of a freeze-through.

Due to the intense heat supplied to the fusible material while it is being treated, the chucks or rod holders heretofore employed tend to thermally distort and shift the fusible material from a position of accurate alignment. Some holding devices also tend to dissipate a substantial amount of heat to adjacent parts of the processing apparatus damaging the connecting parts. Moreover, impurities in the chucks can cause contamination of the fusible material during a float zone melting operation.

SUMMARY OF THE INVENTION

Accordingly, an object of the invention is to provide new and improved methods and apparatus for eliminating damage to supporting facilities and to the fusible material being treated during a float zone melting operation.

Another object of the invention is to provide new and improved methods and apparatus for immediately sensing a freeze-through condition during a float zone melting operation.

Still another object of the invention is to provide a new and improved method for cooling a chuck assembly in a float zone melting operation.

It is a further object of the invention to provide new and improved apparatus for holding material to be processed in accurate alignment during a float zone melting operation.

Another object is to provide apparatus for holding fusible material which is capable of entering heaters and withstanding the temperatures of the heaters.

With these and other objects in mind, an apparatus and system in accordance with the invention includes apparatus for supporting a fusible rod vertically inside an elongated heating chamber, apparatus for moving the rod past a heating source in such a manner as to cause a molten zone to traverse the length of the rod, apparatus for rotating the rod and apparatus for sensing a freeze-through of the molten zone during the melting operation.

In one embodiment, an electrical signal is obtained during a freeze-through from the relative motion of the rod and the apparatus supporting the rod from a combination of at least one magnet and at least one switch activated by the magnet.

In another embodiment of the invention, the fusible rod is attached to a single crystal seed which is secured to a second rod by a clamping assembly which has a spacer for aligning the single crystal seed with the second rod.

In another embodiment of the invention, a portion of the apparatus for supporting the fusible rod vertically and causing movement of the rod is supplied with liquid coolant.

BRIEF DESCRIPTION OF THE DRAWINGS

Other objects, advantages and aspects of the invention will become apparent by reference to the following detailed specification and drawings of specific embodiments thereof, wherein:

FIG. 1 is a schematic drawing showing a fusible rod and facilities for supporting and heating the rod inside a vertical, elongated heating chamber;

FIG. 2 is a schematic view, partly broken away, of a splash plate and quartz rod clamping assembly taken on line 2—2 in FIG. 1;

FIGS. 3 and 4 illustrate, respectively, the plan and elevation views of a spacer for the clamping assembly shown in FIGS. 1 and 2;

FIGS. 5 and 6 illustrate, respectively, the plan and elevation views of a chuck for the clamping assembly shown in FIGS. 1 and 2;

FIG. 7 is a schematic drawing, in partial cross-section, of a lower chuck assembly illustrating freeze-through sensing apparatus;

FIG. 8 is an enlarged view illustrating apparatus for transmitting cooling fluid to the lower chuck assembly shown in FIG. 7;

FIG. 9 illustrates rotary cooling apparatus for introducing cooling fluid into the apparatus illustrated in FIG. 8; and FIG. 10 is a schematic diagram illustrating the wiring arrangement for the freeze-through sensing apparatus.

DESCRIPTION OF THE PREFERRED EMBODIMENT

Referring to FIG. 1, there is shown a vertical, elongated heating chamber 5 in which an upper chuck assembly 6, and a lower chuck assembly 7 are located. Conventional means for independently as well as simultaneously advancing the upper chuck assembly 6 and the lower chuck assembly 7 vertically and transmitting torque of rotation to said chuck assemblies are shown respectively by driving units 8 and 9 which can be located either inside or outside the heating chamber 5. The chuck assemblies 6 and 7 support a cylindrical rod 10 of fusible material on which it is desired to perform a float zone melting operation. Immediately surrounding the rod 10 is a heating apparatus 12 including a single turned induction heating coil 13 which is supplied with an electrical signal by a coaxial cable 14. The coil 13 forms a molten zone 10' in the rod 10. Movement of the rod 10 relative to the coil 12 causes the molten zone 10' to traverse the length of the rod 10.

Referring to FIGS. 1 and 2, there is shown a clamping assembly 16 for securing a seed crystal 18 to a quartz rod 19. The seed 18 has a single crystal structure which it is desired that the rod 10 have at the end of the float zone melting operation. This clamping assembly 16 contains a splash plate 20 which protects the assembly from molten metal during the operation of the float zone melting apparatus. The clamping assembly 16 also includes an upper spring clamp 22 and a lower spring clamp 23. The upper clamp 22 holds the seed crystal 18 against a spacer 24 (FIGS. 3 and 4), while the lower clamp 23 secures the quartz rod to a chuck 25 (FIGS. 5 and 6). The spring clamps 22 and 23 are tightened by turning clamping screws 26 and 27, positioned in a plate 28, against the chuck 25. The spacer 24 (FIGS. 3 and 4) is employed when the seed crystal 18 to be treated is not the same size as the quartz rod 19. A pin (not shown) is inserted through a hole 30 in the chuck (FIGS. 5 and 6) and a hole 31 in the spacer 24 (FIGS. 3 and 4) to lock the spacer in its proper position. Thus, the seed crystal 18 is secured firmly but somewhat elastically to the quartz rod 19 by means of the clamping assembly 16.

As seen in FIG. 7, the lower end of the quartz rod 19 is supported and moved by lower chuck assembly 7. The lower chuck assembly 7 includes an outer casing 34, a plate 35, a drive adapter 36 and a threaded retaining ring 37. A pin 39 limits the position of the quartz rod 19 in the chuck assembly.

During normal operation, the rotation of the outer casing 34 (by means not shown) is communicated to the quartz rod 19 by the friction in two spaced sets of ball bearings 40—40. If a freeze-through occurs during the float zone melting operation, the rotation of outer casing 34 is not communicated to the quartz rod 19. Thus, the lower chuck asembly 7 acts as a slip clutch so that only a predetermined maximum amount of torque can be applied to the pull rod 19, as determined by the amount of friction which exists in the ball bearings 40—40.

A freeze-through is detected by one or more dry reed switches 42—42 (preferably four) which are encased in nonconductive material 43 inside a circular plug assembly 45 which is in threaded engagement with the outer casing 34. Lead wires 46—46 connect the switches 42—42 to the circular plug assembly 45, while lead wires 48—48 connect the switches to a pin 49 which terminates in a cup element 50. These dry reed switches are activated by means of magnets inside a magnet retainer 51. Thus, when a freeze-through occurs and the quartz rod 19 does not rotate with the outer casing 34 the relative motion between the magnets and the dry reed switches causes the switches to be recurrently activated at a rate proportional to the relative rotation of these elements.

The lower chuck assembly 7 is maintained at the desired temperature by passing liquid coolant through a cooling tube 53. This liquid coolant flows between the coils of a spring 54 and returns in the space between the cooling tube 53 and the outer casing 34 to a rotary cooling assembly 56 (FIG. 9). An O-ring 58 in the circular plug assembly 45 prevents the coolant from entering the lower chuck assembly 7.

Referring to FIG. 8, an enlarged view of the cooling tube 53 is shown connected to the cup element 50 by the spring 54. The lower end of the spring 54 is fixed in a hole 59 located in the tube 53, while the upper end of the spring 54 is positioned inside a channel 60 located on the bottom of the cup element 50. A nonconductive sleeve 61 holds the spring 54 in place and prevents any electrical conduct between the cup element 50 and the outer casing 34. A similar sleeve 62 prevents electrical contact between the cooling tube 53 and the outer casing 34.

The rotary cooling assembly 56 is illustrated in FIG. 9. The lower end of the outer casing 34 is in threaded engagement with an inner assembly 64, which is positioned inside a housing 65. Bearings 67—67 permit the inner assembly 64 and the outer casing 34 to rotate while the housing 65 remains stationary. A retaining nut 68 secures the outer races of the bearings 67—67 to the housing 65, while a lock nut 70 secures the inner races to the inner assembly 64. An O-ring 71 prevents coolant from passing between the outer casing 34 and the inner assembly 64. O-rings 72—72 similarly prevent coolant from passing between the inner assembly 64 and the housing 65. Coolant returning between the coolant cooling tube 53, outer casing 34 and inner assembly 64 is discharged through a conduit 74. A pair of sleeves 75 and 76 prevent any electrical contact between the housing 65 and the tube conduits 53 and 74.

The freeze-through sensing circuit is illustrated in FIG. 10. One end of each dry reed switch 42 is connected to ground through the lead 46 while the other end is connected via the lead 48 to a sensing circuit 80. When relative rotary motion occurs between the magnet assembly 51 (FIG. 7) and the dry reed switches 42—42, the switches are activated and alternately open and close. Each time the switch contacts close, relay K1 is activated.

In the sensing circuit 80, 28 volts is from a positive voltage source 81 applied through a normally closed contact 83 of the relay K1 to a 28 microfarad capacitor 85, the opposite terminal of which is grounded. However, when the dry reed switches momentarily close, the relay K1 is activated opening the contact 83 and closing a normally open contact 84. This causes the 28 microfarad capacitor 85 to be disconnected from the positive voltage source 81 and discharged through the coil 86 of a relay K2, thereby causing the momentary closing of its normally open contact 87. Current is thus permitted to flow through a normally closed contact 88 of relay K3 and the contact 87, thereby activating a stepping coil 89 of a stepping relay K4 comprising switches 90 and 91.

The stepping coil 89 activates the stepping relay switches 90 and 91, the arms of which move together, advancing one position for each pulse applied to the stepping coil 89. When the stepping relay switch 90 advances one position from its rest position, it causes 120 volts A.C. to activate a timer 92 with relay K5. In FIG.

10, a selector switch 93 is indicated as positioned to respond to the stepping relay K4 when six pulses are generated by the dry reed switches 42—42 before expiration of the time set for the timer 92. When the rotor of the selector switch 91 reaches the arbitrarily selected sixth position (as shown in FIG. 10), the coil 94 of a relay K6 is activated, closing a normally open contact 95 and opening a normally closed contact 96. When contact 96 of the relay K6 is opened current is no longer supplied through line 97 to the float zone melting operation and the operation is terminated. Simultaneously, a warning light 98, which is located on the instrument panel of the float zone melting apparatus is activated.

Normally, the timer in relay K5 is set for a period of about 6 to 10 seconds. At the end of this period, the coil 99 causes a normally open contact 100 to close and a normally closed contact 101 to open. Current passing through contact 100 activates a coil 102 of the relay K3 which causes the normally open contact 103 to close and the normally closed contact 88 to open. An open normal contact 104 is closed and an interrupt spring 105 causes the stepping coil 89 to be activated thereby causing the rotors on stepping relay switches 90 and 91 to move to their original rest position. The stepping relay K4 is thus reset. The reset action ceases when the rotors on the stepping relay switches 90 and 91 reach their original reset position and the open normal contact 104 breaks the path through the interrupt spring 105. Operation of the float zone apparatus is resumed by momentarily removing power from the circuit thus allowing relay K6 to return to its original position.

OPERATION

In normal practice a float zone melting operation can be performed in a vertical, elongated heating chamber 5 on a polycrystalline rod of fusible material 10 which may be as long as 24″ and which has a diameter of over 1¼″. The rod is supported vertically in the chamber by an upper chuck assembly 6 and a lower chunk assembly 7. Initially, the clamping assembly 16 is loaded with a single crystal seed 18. The rod of fusible material 10 is positioned slightly above the single crystal seed 18. A heated (not molten) zone caused by the induction heating coil 13 is caused to traverse the length of the rod 10 driving out any moisture and other volatile impurities from the rod. At the bottom of the rod 10, a tear drop of molten material is formed and the single crystal seed 18 is caused to contact the molten tear drop.

With the uniting of the single crystal seed 18 and the rod 10, the rod 10 is moved slowly downwardly through the induction heating coil 13. This causes the molten zone 10′ to slowly traverse the rod 10 and, when the molten zone 10′ resolidifies, it assumes the single crystal formation of the seed 18.

As the fusible material 10 is heated with the induction heating coil 13 to very high temperatures, for example, above 1400° C. for silicon, the supporting structures are subjected to very intense heat and the structures must be capable of elastically yielding to elongation of the fusible material without change in position of the fusible material. Accordingly, the clamping assembly 16 is desirably made of tantalum and the splash plate 20 can be formed from molybdenum to withstand the extreme temperatures as well as molten silicon. By maintaining a constant flow of liquid coolant, such as water, passing through the cooling tube 53, the lower chuck assembly 7 is effectively maintained at a desired temperature level.

The molten zone 10′ is stirred by rotating the seed 18 and slightly by the magnetic field at the coil 13. If, at any time, the molten zone 10′ which traverses the fusible material freezes through lower chuck assembly 7 torque is not transmitted to the quartz rod 19 and relative motion occurs between dry reed switches 42 and the magnets in the magnet retainer 51. This relative motion activates the freeze through sensing circuit 80. The stepping coil 89 of the sensing circuit causes stepping relay switches 90 and 91 to move simultaneously one position each time a dry reed switch momentarily closes until the switch 91 reaches the preset position of the selector switch 93, at which time the rotation of the lower chuck assembly 7 is terminated and a warning light on the float zone melting apparatus is activated.

When the seed 18 or the lower chuck assembly 7 expands due to high temperatures, this expansion is compensated for by clamps 22 and 23 of the clamping assembly 16 without causing cracking of the seed or misalignment of the rod 10 with respect to the induction heating coil 91. Thus, the present invention utilizes unique spring clamping apparatus which is capable of maintaining a quartz rod and a seed crystal in proper alignment under extreme differences in heat and affords the clamping of material having different diameters. The deleterious effects of heat on the chuck assembly are avoided by supplying liquid coolant directly from rotary assembly 70 to the chuck assembly.

At the conclusion of the float zone melting operation, when the molten zone 10′ has traversed the entire length of the rod 10, the resulting rod has a single crystal structure. When the float zone melting operation is completed and the rod 10 is cool, the rod and single crystal seed 18 can be readily withdrawn from the clamping assembly 16.

It is to be understood that the above-described method and arrangements of apparatus and construction of elemental parts are simply illustrative of an application of the principles of the invention and many other modifictions my be made without departing from the invention.

What is claimed is:

1. Apparatus for forming a single crystal rod of semiconductive material from a fusible rod by float zone melting and sensing a freeze-through in the molten zone of the fusible rod during the melting operation, which comprises:

a vertical, elongated heating chamber;
means for supporting the fusible rod vertically in the chamber, said supporting means including an upper and a lower chuck;
means inside the chamber and immediately adjacent the rod for heating the rod to form a molten zone;
means for moving a single crystal seed into contact with the molten zone and then vertically advancing in unison the upper and lower chucks to move the rod past the heating means and cause the molten zone to traverse the length of the rod;
means for transmitting a predetermined maximum amount of torque to the rod by rotation of at least one chuck; and
means for obtaining an electrical signal from the relative motion of the rod and at least one chuck during a freeze-through.

2. Apparatus of claim 1, wherein said fusible rod is polycrystalline and wherein said electrical signal is obtained from a combination of magnets and switches activated by said magnets.

3. Apparatus for performing a float zone melting operation on a fusible rod and sensing a freeze-through in the molten zone of the fusible rod during the operation, which comprises:

a vertical, elongated heating chamber;
means for securing the fusible rod to a second rod;
means for supporting the fusible rod and the second rod vertically in the chamber, said supporting means including an upper and a lower chuck;
an induction heating coil immediately surrounding the fusible rod for heating the fusible rod to form a molten zone;
means for advancing the upper and the lower chucks to move the fusible rod past the heating coil causing the molten zone to traverse the fusible rod lengthwise;

means for transmitting a predetermined maximum amount of torque to the fusible rod and the second rod by rotation of a chuck;

means for obtaining an electrical signal from the relative motion of the second rod and the chuck during a freeze-through of the fusible rod; and means for terminating the float zone melting operation when an electrical signal is obtained from said relative motion of the second rod and the chuck.

4. Apparatus of claim 3, wherein said fusible rod is polycrystalline and which further includes:

clamping means for securing a single crystal seed between said fusible rod and said second rod; and means for advancing the single crystal seed into contact with the molten zone prior to simultaneous advancement of the upper and lower chucks so that a single crystal rod is formed on resolidification following the float zone melting operation.

5. Apparatus of claim 4, wherein said clamping means has a spacer for aligning the single crystal seed with the second rod.

6. Apparatus of claim 3, wherein the electrical signal is obtained from a combination of at least one magnet and at least one switch activated by said magnet and which further includes:

means for supplying liquid coolant to at least one chuck during the float zone melting operation.

7. Apparatus of claim 5, wherein the switch activated by the magnet is a dry reed switch.

References Cited

UNITED STATES PATENTS

| | | | |
|---|---|---|---|
| 2,872,597 | 2/1959 | Ormond | 307—133 |
| 2,976,378 | 3/1961 | Goddard | 200—61.45 |
| 3,211,881 | 10/1965 | Jablonski et al. | 23—273 X |
| 3,251,658 | 5/1966 | Hambach et al. | 23—273 X |
| 3,264,560 | 8/1966 | Cheney | 340—271 X |

FOREIGN PATENTS 1,115,966   6/1968   Great Britain.

NORMAN YUDKOFF, Primary Examiner

R. T. FOSTER, Assistant Examiner

U.S. Cl. X.R.

335—205; 340—271